United States Patent [19]

Hoenle et al.

[11] Patent Number: 4,533,157
[45] Date of Patent: Aug. 6, 1985

[54] REAR OFFSET AXLE SUSPENSION SYSTEM FOR VEHICLE

[75] Inventors: Walter A. Hoenle, Warren; David J. Perkins, Royal Oak; James L. Schenten, Sterling Heights, all of Mich.

[73] Assignee: Chrysler Corporation, Highland Park, Mich.

[21] Appl. No.: 591,350

[22] Filed: Mar. 19, 1984

[51] Int. Cl.³ .............................................. B60G 11/02
[52] U.S. Cl. .................................... 280/718; 280/688; 267/9 R; 267/18; 267/49; 267/53
[58] Field of Search ............... 280/688, 713, 718, 724, 280/725, 720, 710; 267/7, 9 R, 18, 24, 31, 36 A, 47, 49, 50

[56] References Cited

U.S. PATENT DOCUMENTS

| | | | |
|---|---|---|---|
| 4,125,276 | 11/1978 | Levasseur | 280/718 |
| 4,362,318 | 12/1982 | Lampert | 280/718 |
| 4,410,201 | 10/1983 | Iijima | 280/688 |
| 4,418,896 | 12/1983 | Shinbori | 280/718 |
| 4,452,435 | 6/1984 | Shinbori et al. | 280/718 |
| 4,466,636 | 8/1984 | Cornacchia | 280/688 |
| 4,491,341 | 1/1985 | Mabayashi | 280/688 |

Primary Examiner—Richard A. Bertsch
Attorney, Agent, or Firm—Edward P. Barthel

[57] ABSTRACT

A suspension system for the rear wheels of a motor vehicle includes a pair of leaf springs having their fore and aft ends pivotally mounted to the vehicle frame or body. The leaf springs flexibly support a tubular rear axle member forwardly and downwardly offset from the rear wheel spindles by a pair of left and right one-piece castings. Each casting has an outboard spindle mounting L-shaped angle portion and an inboard forwardly and downwardly offset collar portion joined by a canted bridging portion. The collars each receive one end of the tubular axle member. The casting include a jounce deflection stop-plate for engaging its associated frame bumper. Leaf springs are seated on each casting below the spindle axis and above the tubular axle member reducing the design height of the vehicle. The tubular axle portion and spindles are constrained to move equal distances during upward jounce deflection.

2 Claims, 5 Drawing Figures

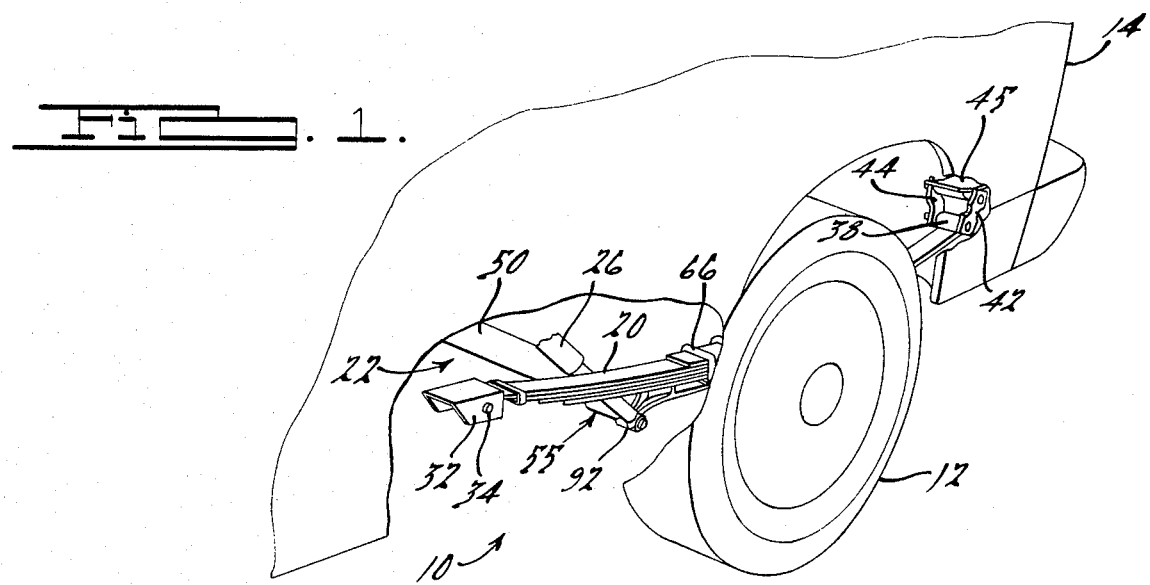
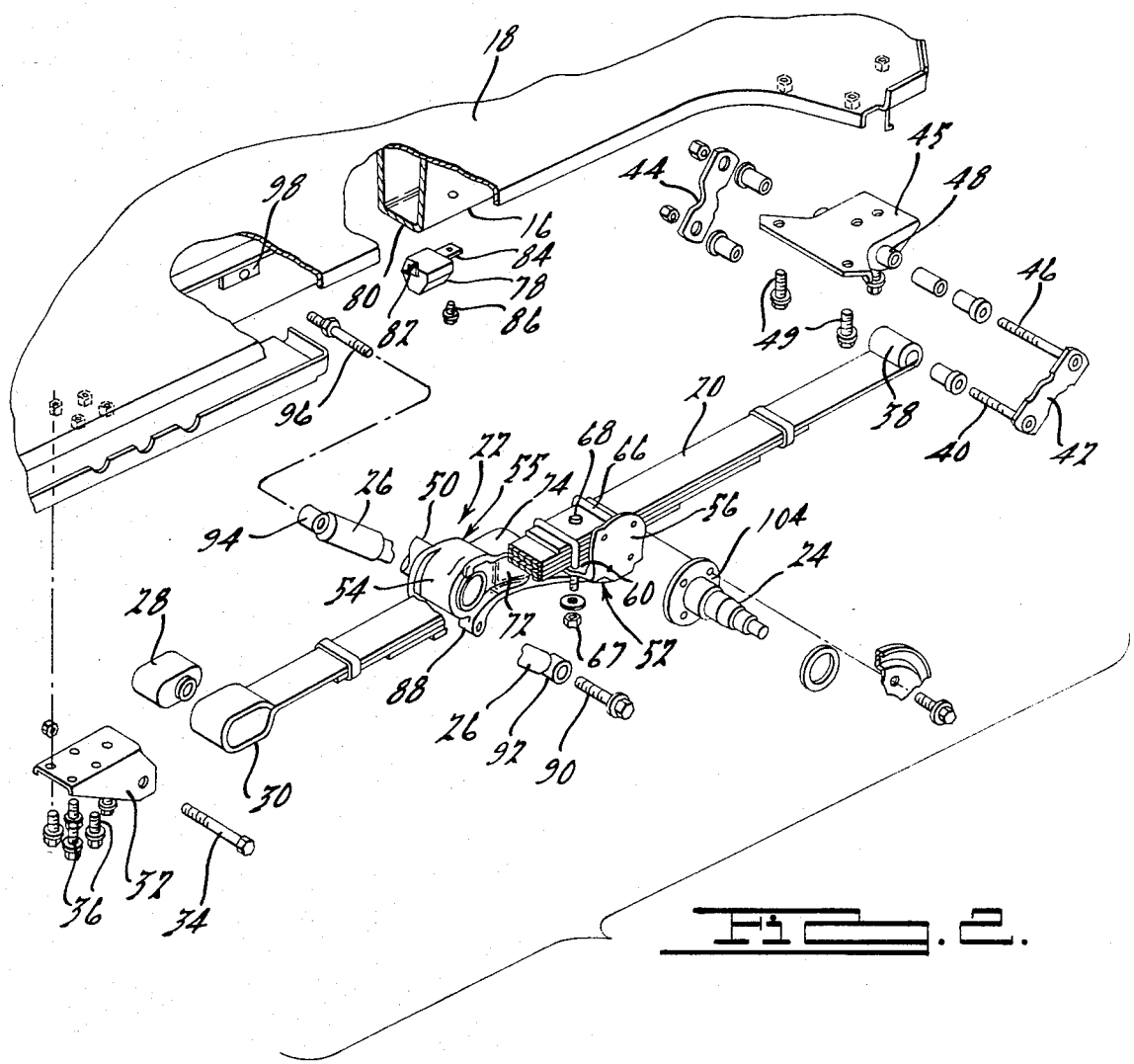

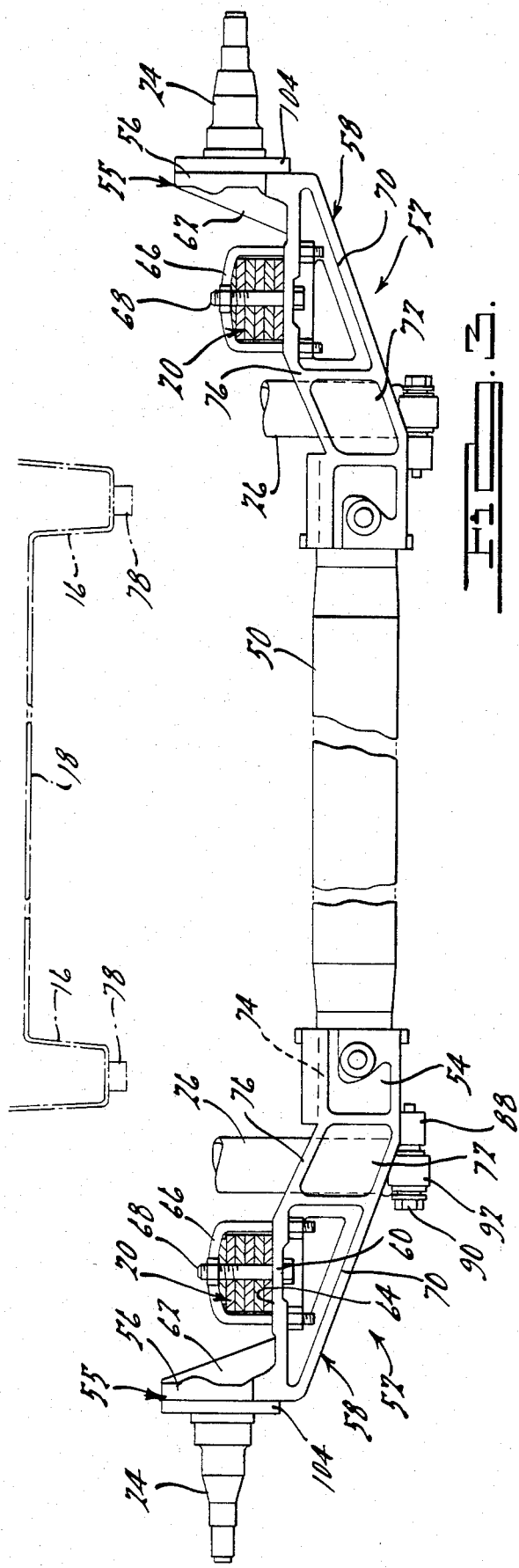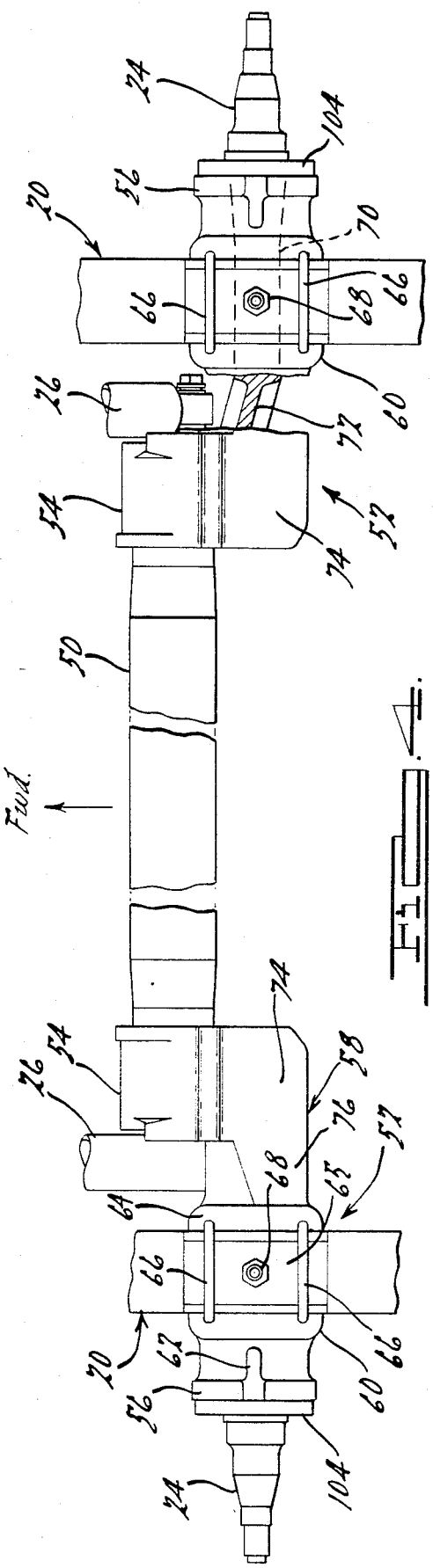

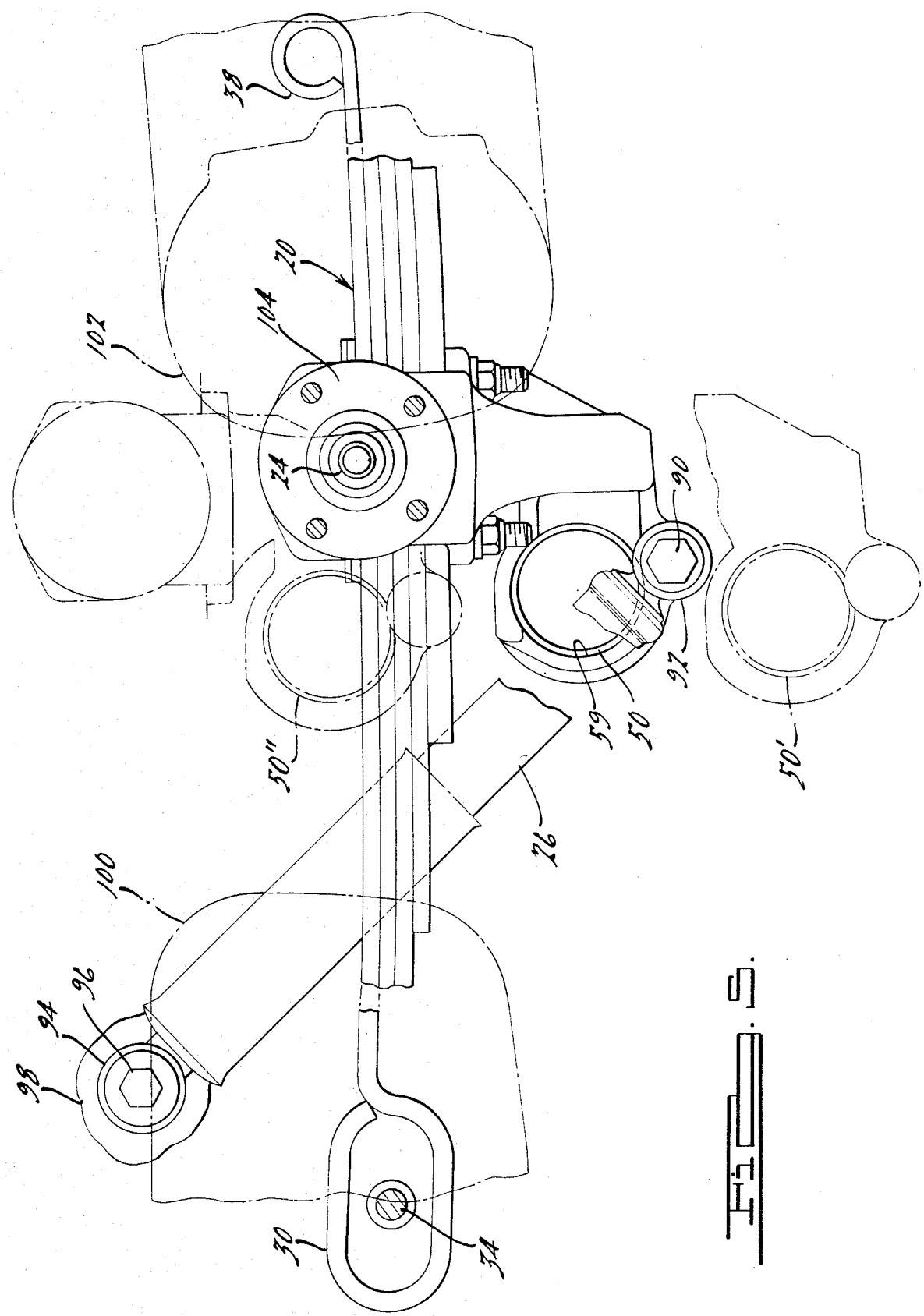

REAR OFFSET AXLE SUSPENSION SYSTEM FOR VEHICLE

BACKGROUND OF THE INVENTION

The present invention relates generally to rear axle leaf spring suspension systems for motor vehicles and more specifically to a suspension system with an offset rear axle.

Suspension systems for rear, non-driven wheels of motor vehicles which employ offset axles are known in the art. U.S. Pat. No. 4,410,201 issued Oct. 18, 1983 is exemplary of these prior art systems. The rear axle leaf spring suspension system of the present invention is directed at improving the known prior art systems in certain respects such as economy of manufacture and compactness of design, while providing a smooth relatively harsh-free ride.

It is accordingly an object of the present invention to provide an economical, easily assembled rear wheel leaf spring suspension system for a motor vehicle with leaf springs supporting lateral, vertical and longitudinal loads of the vehicle body together with a forwardly and downwardly offset straight tubular axle member extending transversely to clear depending vehicle underbody components.

It is another object to provide a rear axle leaf spring suspension system configured to achieve a reduced vehicle design height.

It is yet another object to provide in the offset rear axle leaf spring suspension system a wheel support apparatus having improved strength and reliability characteristics.

According to a feature of the invention a forwardly offset axle system is provided in which a tubular transverse axle member of constant circular cross-section is forwardly offset from the rear wheel spindles to pass between the vehicle gas tank and spare tire carrier supported on the underside of the body floor pan. A pair of mirror image axle castings support each end of the offset axle providing leaf spring and wheel spindle seating means in combination with a telescopic shock absorber strut mounting and a jounce bumper stop plate.

BRIEF DESCRIPTION OF THE DRAWINGS

These and other objects and features will become apparent to those skilled in the vehicle wheel suspension art upon reading the following description with reference to the accompanying drawings in which:

FIG. 1 is a fragmentary perspective view of a rear axle suspension system with parts broken away embodying the invention;

FIG. 2 is a perspective, exploded view of the rear wheel suspension system of FIG. 1;

FIG. 3 is a fragmentary front elevational view, partly in section, of the rear axle suspension system of the present invention;

FIG. 4 is a fragmentary top elevational view, with parts broken away, of the rear axle suspension system of its present invention; and FIG. 5 is a fragmentary side elevational view of the rear suspension with lower rebound and upper jounce deflection positions shown in dashed lines.

DETAILED DESCRIPTION OF THE PREFERRED EMBODIMENT

Referring now to the drawings, and in particular to FIGS. 1 and 2, there is shown a leaf spring suspension system 10 for the rear wheels 12 of a motor vehicle having a body partially indicated at 14. The suspension system is adapted to be carried by the vehicle frame including side frames or rails 16 reinforcing body floor pan 18.

As seen in FIG. 2 the rear axle suspension system 10 consists essentially of a pair of multi-leaf springs 20, a non-driving rear axle assembly 22 rotatably supporting the rear road wheels 12, a pair of wheel support spindles 24 for mounting the wheels at the ends of the offset axle assembly and a pair of telescopic shock absorber struts 26 of known design interconnected between the axle assembly and the motor vehicle body. In the following description, it should be understood that because of the symmetry of the suspension system about the longitudinal centerline of the vehicle, only one of the pair of identical axle and suspension components will be described.

The multi-leaf spring 20 has a resilient bushing 28 captured within an eye 30 at its front end. The bushing 28 is connected to a hanger 32 in a conventional manner by means of bolt 34. The hanger 32 is suitably fastened to body floor pan 18 by bolts 36. At its aft end the multi-leaf spring 20 is formed with an eye 38 receiving a first bolt 40 of a shackle formed by a pair of parallel plates 42 and 44. The shackle is conneced to a bracket 45 by a second bolt 46 extending through bushing 48 of the bracket. The bracket 45 is secured to the vehicle body floor pan by means of bolts 49.

As best seen in FIGS. 3, 4 and 5 the axle assembly 22 includes a transverse straight tubular member 50 of constant or uniform circular cross-section having a pair of left and right integral castings 52 received on either end thereof. As the castings are mirror images of each other only one casting will be described in detail along with its associated multi-leaf spring 20 and shock absorber 26.

The casting 52 includes an inboard collar portion 54 and an outboard L-shaped member 55 having a vertically extending spindle mounting plate 56 integrally formed with an intermediate connecting body or bridge portion 58. The casting collars 54 have transverse bores 59 sized to receive the ends of the tubular axle member 50 in a press fit manner. The axle member 50 is also welded to the collar to complete the press fit connection. The bridge portion includes a first substantially horizontally disposed plate 60 of the L-shaped member, integral with the vertical plate 56 and a triangular upstanding web 62.

The horizontal plate 60 has a planar mounting surface 64 sized to seat an intermediate portion 65 of the leaf spring 20. The leaf spring is connected to the plate surface 64 by a pair of U-bolt clamping fixtures generally indicated at 66 retained by nuts 67. To prevent any longitudinal movement of the leaf springs 20 relative to the casting 52 a threaded stud 68 extends vertically through aligned holes in the center of plate surface 64 and multiple leafs of spring 20. It will be noted that the leaf spring may have either 4 or 5 leaf assemblies, in the preferred form, allowing the suspension to be load tailored to the vehicle weight.

The bridge portion 58 further comprises an integral truss portion having a first triangular shaped flanged truss portion 70 extending transversely and coextensive with the horizontal plate 60. The bridge portion includes a second parallelogram shaped truss portion 72 angled inwardly and forwardly from portion 70 for juncture with the aft area of integral collar portion 54. In FIG. 4 the right hand casting 52 is shown with portions broken away indicating the inwardly and forwardly angled orientation of the parallelogram shaped truss portion 72. The truss portion 72 is joined to the transversely extending triangular shaped truss 70 at the inboard edge of the plate 60.

It will be noted in FIGS. 3 and 4 that the casting plate 60 is joined to a horizontally disposed jounce plate 74 by an inwardly and downwardly inclined upper flange plate 76 coextensive with the angled truss portion 72. The jounce plate 74 upper surface provides a bumper stop limiting the upward travel of the axle suspension system upon contact with a frame bumper member 78. As seen in FIGS. 2 and 3 the bumper member 78, formed of rubber or plastic material, is fixed to horizontal bight portion 80 of its associated side frame members 16. Each bumper member 78 is secured by means of a locking tab 82 received in a corresponding bight slot (not shown) and a tongue portion 84 receiving a bolt 86 for threaded attachment to the bight portion 80.

FIG. 2 shows each collar portion 54 formed with a depending boss 88 having a transverse bore for receiving a threaded bolt 90. The lower end of shock absorber strut 26 has an eyelet 92 apertured to receive the bolt 90 pivotally securing the strut lower end to its associated casting intermediate its leaf spring 20 and the outboard end of collar 54. The upper end of the strut 26 has an eyelet 94 receiving a bolt 96 pivotally securing the strut to flange 98 on the underside of the body floor pan 18.

With reference to FIG. 5 it will be seen that the rear axle suspension system of the present invention allows the axle assembly to travel from a lower rebound position to an upper jounce position. During this travel the forwardly offset tubular axle member 50, shown in its neutral full line position, moves from a lower rebound deflected position 50' to an upper jounce deflected position 50''. It will be noted that the system provides an uppermost jounce deflected limit position wherein each casting jounce plate 74 contacts it associated frame mounted bumper 78.

In FIG. 5 it will be seen that the forwardly offset tubular axle member 50 in its upper jounce deflected position is longitudinally spaced intermediate fuel tank 100 and spare tire 102, both shown in phantom lines. This suspension structure allows the rear wheel spindle 24 to be positioned rearwardly and upwardly of the axle member 50 providing a longer wheel base dimension for the vehicle. In the preferred form, the casting design achieves about a four inch rear offset and a four inch vertically upward offset for the rear wheel spindles 24 from the center of the tubular axle member 50.

Further, applicants unique design allows each leaf spring 20 to be positioned vertically within the transverse confines of its corresponding spindle mounting flange 104. This compact arrangement permits the leaf spring intermediate portion 65 to be located vertically below the axis of the spindles 24 and above the tubular axle 50. As a result the overall body structure is lowered relative to the axis of the spindles reducing the vehicle's overall height. The tubular axle member 50 and end castings 52 reduces cost of the axle assembly over other configurations such as I-section beams, for example.

The employment of the straight tubular axle hollow pipe member 50, allows its ends to be readily press-fitted into casting collar bores 59. This avoids other costly fabrication methods such as bending a tubular member as shown, for example, in the above mentioned Iijima et al Pat. No. 4,410,201. It will be appreciated that the bent tube of the Iijima patent results in high shear stress conditions at the bend areas. Further, the Iijima axle presents alignment problems during manufacture and requires that the axle be reinforced.

While only one embodiment of the inventive rear wheel suspension apparatus has been described, others are possible without departing from the scope of the appended claims.

What is claimed is:

1. A rear axle suspension apparatus for the rear wheels of a motor vehicle, the vehicle having a body with laterally spaced apart left and right side frame members, each frame member having a jounce bumper supported on the underside thereof, the suspension apparatus comprising; left and right longitudinally extending leaf springs having their fore and aft ends pivotally connected on said body; a non-driving rear axle assembly rotatably supporting left and right road wheels on axially aligned spindle shafts; said axle assembly having a transversely extending tubular axle member and a pair of mirror image left and right castings, each said casting having an inboard portion attached to one end of said tubular axle member and an outboard L-shaped angle portion formed intergral with an intermediate bridge portion; said L-shaped angle portion including a vertical spindle mounting plate and a horizontal attaching plate seating the central portion of its associated leaf spring; each said attaching plate positioned to locate its leaf spring intermediate portion a predetermined distance above said tubular axle member and below the spindle shaft axis; each said casting having a substantially horizontally disposed jounce plate providing a jounce deflection stop for its associated side frame bumper; whereby said tubular axle member and said spindle shafts are constrained to move in substantially equal vertical paths throughout the travel of said axle assembly between its uppermost jounce and its lowermost rebound deflections so as to clear vehicle components supported on the underside of said body and reduce the height of said vehicle.

2. A rear axle suspension apparatus for the rear wheels of a motor vehicle, the vehicle having a body floor pan with laterally spaced apart left and right longitudinally extending side frame members on the underside of said floor pan, each frame member having a jounce bumper supported on the underside thereof, the suspension apparatus comprising, left and right longitudinally extending leaf springs having their fore and aft ends pivotally connected on the underside of said floor pan, left and right telescopic shock absorber struts, each said strut having its upper end pivotally attached to said floor pan outboard of its associated frame member, a non-driving rear axle assembly rotatably supporting left and right road wheels on axially aligned transverse spindle shafts, said axle assembly comprising a transversely extending tubular axle member of constant circular cross-section having its axis offset both downwardly and forwardly a predetermined distance from the axis of said spindle shafts, a pair of mirror image left and right one-piece castings, each said casting having an inboard collar portion and an outboard L-shaped angle portion joined by an intermediate bridge portion, said L-shaped angle portion including a vertical spindle mounting plate and a horizontal leaf spring attaching plate, each said leaf spring attaching plate positioned a predetermined distance above said tubular axle member and below the axis of said spindle shafts, each said collar portion having a transversely aligned bore fixedly receiving one end of said tubular axle member therein, each said casting having a substantially horizontally disposed jounce plate extending rearwardly from its associated collar portion providing a jounce deflection stop for its respective side frame bumper, means on each said casting intermediate its leaf spring attaching plate and the outbord end of its collar portion pivotally connected to the lower end of its associated strut, such that each said strut pivots in a longitudinal plane intermediate its respective leaf spring and side frame member, and whereby said tubular axle member and said spindle shafts are constrained to move in substantially equal paths throughout the travel of said axle assembly between its uppermost jounce and lowermost rebound deflections so as to clear vehicle components supported in the underside of said body and reduce the design height of said vehicle.

* * * * *